July 12, 1932. W. L. SHELLABARGER 1,867,541
PROCESS OF MANUFACTURING SOY BEAN FLOUR
Filed Nov. 9, 1931
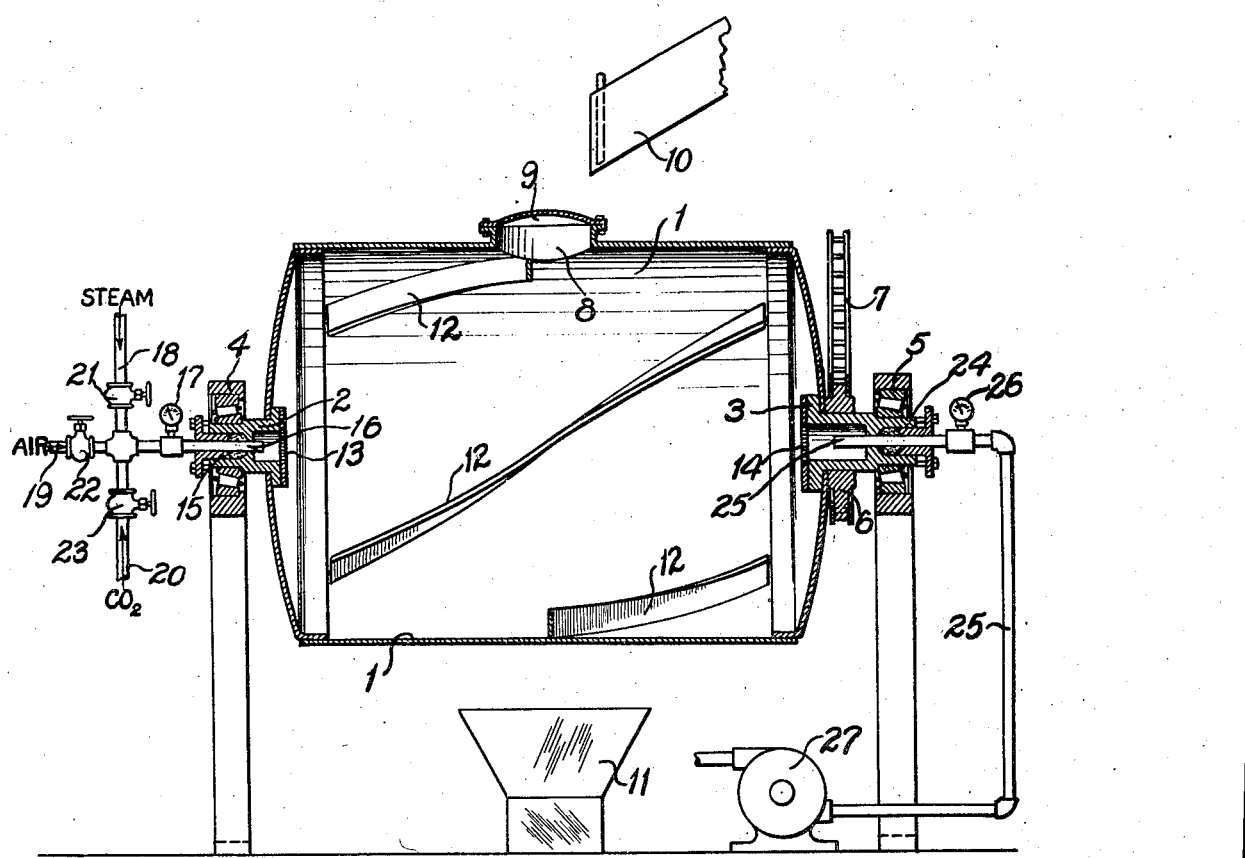

Patented July 12, 1932

1,867,541

UNITED STATES PATENT OFFICE

WILLIAM L. SHELLABARGER, OF DECATUR, ILLINOIS, ASSIGNOR TO SHELLABARGER GRAIN PRODUCTS COMPANY, OF DECATUR, ILLINOIS, A CORPORATION OF ILLINOIS

PROCESS OF MANUFACTURING SOY BEAN FLOUR

Application filed November 9, 1931. Serial No. 573,767.

This invention relates to the manufacture of soy bean flour, and, with regard to certain more specific features, to the manufacture of soy bean flour of improved food value.

Among the several objects of the invention may be noted the provision of a method of manufacturing soy bean flour wherein the natural sow bean constituents, chiefly albuminoids and the like, are retained in soluble condition; a soy bean flour in which objectionable odors, arising from oils and the like in the natural sow beans, are removed during manufacture of the flour, so that the resulting flour is clear, sweet, and devoid of objectionable flavors and odors; a soy bean flour which is much whiter than prior products of a similar nature; and the provision of a process for manufacturing such soy bean flour which is simple and economical. Other objects will be in part obvious and in part pointed out hereinafter.

The invention accordingly comprises the elements and combinations of elements, steps and sequence of steps, and features of composition and synthesis, which will be exemplified in the products and processes hereinafter described, and the scope of the application of which will be indicated in the following claims.

The accompanying drawing is a diagrammatic view of a portion of the apparatus used in the invention.

Although the constituents of soy beans are such, and are in such a combination, as to present a highly valuable foodstuff the inherent odors and flavors of the beans have heretofore rendered them relatively unsuitable for foodstuff use. Processes have been proposed for removing such odors, but in general these have been unsatisfactory from one or another standpoint. Possibly the most satisfactory procedure heretofore described comprised subjecting soy beans to a short treatment with steam at temperatures of the order of 212° F. and higher, so that the steam reacted upon, but was not absorbed by the beans in excess of a very small amount. This procedure, although satisfactory in a qualified manner so far as deodorizing and flavor neutralizing is concerned, defeats its own purpose in one respect, viz: instead of presenting a soy bean flour containing the natural constituents of the soy beans in a condition readily available for digestion and commercial utilization, the procedure induces the formation (probably from the albuminoids present) of a considerable quantity of insoluble matter. By insoluble is meant lack of solubility, or ready digestibility, in the gastric juices. So treated, thus, the product flour is not inclusive of the maximum nourishing values derivable from the natural soy beans.

The present invention, in contradistinction, presents a soy bean flour and a process of manufacture therefor, in which deodorization and flavor suppression is achieved, and in which insolubilization is reduced to a minimum, or even entirely eliminated.

Research has shown that insolubilization as above set forth is apparently occasioned to varying extents as the temperature of the steam used for treatment is increased. With steam at 212° F. (atmospheric pressure) and over, the insolubilization takes place to a serious extent. As the temperature is lowered below 212° F., the extent of insolubilization progressively decreases, and at 140° F., or thereabouts, the insolubilization is negligible. However, with some types of soy beans, and to provide a factor of safety, the temperature of treatment may desirably be dropped as low as the order of 120° F.

Referring to the drawing, numeral 1 indicates a rotary drum or retort, supported by its end-headers 2 and 3 in bearings 4 and 5 respectively. A gear 6, driven as by a chain belt 7, is provided for rotating the drum. A charging and discharging opening 8, simulating a man-hole, is provided in one side of the drum. The opening 8, during operation, is closed by a cover 9. A charging spout 10 and discharge hopper 11 are desirably provided, although not essential. Vanes or distributors 12 are desirably provided on the inner walls of the drum 1 to maintain the contents in agitation during treatment. The headers 2 and 3 are provided with screened openings 13 and 14, preventing clogging thereof with beans.

The header 2 comprises the inlet end of the drum 1. Secured in a gas-tight manner by a stuffing gland 15 is a gas inlet pipe 16. The pipe 16 has a pressure gauge 17 thereon, and connects with a steam supply pipe 18, an air supply pipe 19, and a carbon dioxide supply pipe 20. Pipes 18, 19 and 20 are provided with suitable valves 21, 22 and 23, respectively.

The header 3 comprises the outlet end of the drum 1, and is provided with a stuffing gland 24 securing an outlet pipe 25 in gas-tight manner. The pipe 25 is provided with a pressure gauge 26, and connects ultimately with a vacuum pump 27, which discharges into the atmosphere or elsewhere.

Operation of the device is as follows:

Cold, natural soy beans are introduced into the drum 1, until said drum is about one-fourth or one-third full. The cover 9 is then secured on the opening 8, and rotation of the drum is commenced. The valves 21, 22 and 23 are closed, and the vacuum pump 27 operated until the interior of the drum shows a vacuum of the order of 24 inches, more or less, as the case may be. This has (by vapor tension laws) some drying effect upon the beans, although such is not large as the beans are still quite cool.

The purpose of such evacuation is to remove, so far as practicable, all oxygen from the interior drum before the temperature is elevated. Removal of oxygen, it has been determined, is advantageous in that it prevents discoloring of the beans and rancidification of the oil constituents.

The next step of the procedure comprises bringing the temperature of the beans up to the order of that temperature at which it is desired to steam them. This is desirably achieved by opening the valve 23 and flowing preheated carbon dioxide (or other medium inert so far as reactive oxygen is concerned) through the drum. This is continued until the beans are at a temperature slightly above the steam temperature, condensation upon admission of the steam being thus minimized.

Still holding the vacuum at, for example, slightly more than 24 inches, valve 23 is closed and valve 21 is opened to admit steam to the rotating drum. The steam is preferably slightly superheated; that is, for example, its temperature, in the given vacuum, is around 140° F., as contrasted to a saturated steam temperature of 139° F. at the same given vacuum. Maintenance of the 24 inch vacuum keeps the temperature at or below about 140° F., and insolubilization is thus inhibited.

During the steaming of the beans, and in the course of bringing them to steam temperature, an appreciable condensation of steam takes place, with the result that the beans, at this stage, are thoroughly wetted, even though they have been preheated as with carbon dioxide prior to steaming. This is in deliberate contrast to prior teachings, which have greatly emphasized the necessity for keeping the water absorption by the beans to a very small amount. Proceeding according to the present invention, it is found that the deleterious effects heretofore attributed to water absorption by the beans are not obtained, particularly in view of the drying procedure hereinafter described.

The steaming is continued until the undesirable odors and flavors of the raw beans are eliminated. The total time of steaming depends largely upon the temperature, the characteristics of the particular beans being treated, and other factors peculiar to the instant case. In general, forty minutes is a base time from which to vary to suit the particular conditions.

When the beans are sweet and free of undesirable odor, the steam flow is discontinued by closing valve 21 and valve 23 is opened again to admit carbon dioxide to the drum. Accurate maintenance of the 24 inch vacuum is no longer necessary, although it is desirable to maintain some vacuum in order to facilitate drying.

The use of carbon dioxide at this stage of the procedure has been found to be particularly advantageous, as it prevents oxidation of the fats and oils in the beans which might readily be encountered were air to be used.

The carbon dioxide flow slowly cools the beans and at the same time dries them, at least partially. Under some conditions, it is desirable that the carbon dioxide be preheated to a temperature slightly less than that of the beans, and then its temperature progressively decreased to lengthen the cooling period. Such a procedure facilitates drying of the beans. However, under some circumstances, preheating of the carbon dioxide may readily be dispensed with.

Flow of carbon dioxide is continued until the beans have been cooled to the order of 100° F. Below this temperature, they are no longer so readily susceptible to oxidation. Accordingly, the flow of carbon dioxide is terminated by closing valve 23, and air, at atmospheric temperature, is admitted by opening valve 22. The flow of air is continued until the beans are brought to atmospheric temperature and/or they are sufficiently dried.

The rotation of the drum is now stopped with the opening 8 above the discharge hopper 11, and the closure 9 is removed, thus permitting the processed beans to discharge into the hopper 11.

From the hopper, the processed beans are taken through the customary degermination, husking, oil-expressing, and milling operations. The soy oil obtained (preferably by pressure-expression, rather than by solvent extraction) is characterized by its clearness and freedom from objectionable odors and flavors, and is edible without further refining.

The flour obtained as the end product is whiter than similar flours heretofore manufactured, probably because of either a direct bleaching action exerted by the carbon dioxide, or because the dark products of oxidation of the beans heretofore encountered are not present, or for both reasons. No insoluble matter has been produced by the processing, and the flour accordingly exhibits all the nutritive values of the natural beans in readily digestible form, albeit deodorized and deprived of distasteful flavors.

Throughout this exemplary description, the temperature value for treatment has been recited as 140° F. It is to be understood, however, that beneficial results are achieved even though the temperature be somewhat more or less than that value. For instance, the insolubilization occurring at 190° F. is relatively less than that at 212° F. or higher, and, to that extent, 190° F. (and the vacuum corresponding) is advantageous. Also, temperatures less than 140° F. may advantageously be used, both because of the peculiar characteristics of the beans under treatment and to provide a factor of safety of 20°, more or less, thus ensuring the non-insolubilization phenomena.

In view of the above, it will be seen that the several objects of the invention are achieved and other advantageous results attained.

As many changes could be made in carrying out the above compositions and processes without departing from the scope of the invention, it is intended that all matter contained in the above description or shown in the accompanying drawing shall be interpreted as illustrative and not in a limiting sense.

I claim:

1. In a process of manufacturing soy bean flour, the step of improving the odor and flavor of soy beans comprising subjecting said beans to treatment with steam at temperatures below 212° F.

2. In a process of manufacturing soy bean flour, the step of improving the odor and flavor of soy beans comprising subjecting said beans to treatment with steam at temperatures ranging from the order of 120° F. to 212° F.

3. In a process of manufacturing soy bean flour, the step of improving the odor and flavor of soy beans comprising subjecting said beans to treatment with steam at a temperature of the order of 140° F.

4. In a process of manufacturing soy bean flour, the step of improving the odor and flavor of soy beans comprising subjecting said beans to treatment with steam at a temperature of the order of 140° F., and at a vacuum of about 24 inches, and for the order of forty minutes.

5. In a process of manufacturing soy bean flour, the step of improving the odor and flavor of soy beans comprising treating said beans with steam at temperatures of the order of 140° F., and cooling said beans with carbon dioxide gas.

6. In a process of manufacturing soy bean flour, the step of improving the odor and flavor of soy beans comprising treating said beans with steam at temperatures of the order of 140° F., and cooling said beans in stages, the first stage being achieved with carbon dioxide gas and lasting to about 100° F., and the second stage being achieved with air, and terminating at about atmospheric temperature.

7. In a process of manufacturing soy beans flour, the step of improving the odor and flavor of soy beans comprising treating said beans with steam at temperatures of the order of 140° F., and cooling said beans in stages, the first stage being achieved with carbon dioxide gas, said carbon dioxide gas being initially preheated to a temperature slightly lower than 140° F., and then progressively cooler to the order of 100° F., and the second stage being achieved with air at atmospheric temperature, and terminating at about atmospheric temperature.

In testimony whereof, I have signed my name to this specification this 5th day of November, 1931.

WILLIAM L. SHELLABARGER.